United States Patent
Pettersson

(10) Patent No.: US 10,200,414 B2
(45) Date of Patent: Feb. 5, 2019

(54) SIGNALLING ASSYMETRIC MEDIA CAPABILITIES

(71) Applicant: TELEFONAKTIEBOLAGET LM ERICSSON (PUBL), Stockholm (SE)

(72) Inventor: Martin Pettersson, Vallentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 77 days.

(21) Appl. No.: 15/028,160

(22) PCT Filed: Oct. 9, 2013

(86) PCT No.: PCT/SE2013/051187
§ 371 (c)(1),
(2) Date: Apr. 8, 2016

(87) PCT Pub. No.: WO2015/053669
PCT Pub. Date: Apr. 16, 2015

(65) Prior Publication Data
US 2016/0261643 A1    Sep. 8, 2016

(51) Int. Cl.
*H04L 29/02* (2006.01)
*H04L 29/06* (2006.01)
*H04N 7/14* (2006.01)
*H04N 7/15* (2006.01)

(52) U.S. Cl.
CPC ...... *H04L 65/1003* (2013.01); *H04L 65/1006* (2013.01); *H04L 65/1069* (2013.01);
(Continued)

(58) Field of Classification Search
CPC ............. H04L 65/1003; H04L 65/1069; H04L 65/607; H04L 65/1006; H04L 65/608; H04L 69/24; H04N 7/147
See application file for complete search history.

(56) References Cited

U.S. PATENT DOCUMENTS

2003/0028884 A1* 2/2003 Swart ................. H04N 7/17318
  725/51
2004/0240399 A1* 12/2004 Corrao .................... H04L 29/06
  370/260
(Continued)

OTHER PUBLICATIONS

Johnston et al. "Session Description Protocol Offer Answer Examples," published Jun. 28, 2003.*
(Continued)

*Primary Examiner* — Scott B Christensen
(74) *Attorney, Agent, or Firm* — Rothwell, Figg, Ernst & Manbeck, P.C.

(57) ABSTRACT

There are provided mechanisms for signalling asymmetric media capabilities using session description protocol, SDP, signalling. Media capabilities for at least one of sending media streams and receiving media streams are generated by a first electronic device. The first electronic device also generating an SDP offer comprising media descriptions for at least one media stream based on the acquired media capabilities. At least one media stream in the SDP offer is represented by at least two media descriptions. The at least two media descriptions represent asymmetric media capabilities in relation to each other. A first SDP message comprising the generated SDP offer is sent to a second electronic device.

15 Claims, 4 Drawing Sheets

(52) U.S. Cl.
CPC .......... *H04L 65/607* (2013.01); *H04L 65/608* (2013.01); *H04L 69/24* (2013.01); *H04N 7/147* (2013.01); *H04N 7/15* (2013.01)

(56) References Cited

U.S. PATENT DOCUMENTS

| | | | | |
|---|---|---|---|---|
| 2007/0133527 A1* | 6/2007 | Kuure | ................. | H04L 12/1836 370/389 |
| 2012/0087245 A1* | 4/2012 | Leung | .................... | H04L 47/12 370/236 |
| 2013/0034222 A1* | 2/2013 | Li | ..................... | H04M 3/42017 379/207.16 |

OTHER PUBLICATIONS

Rosenberg et al. "An Offer/Answer Model with the Session Description Protocol (SDP)," published Jun. 2002.*

"SIP Multiple m-line Support." Posted at <http://www.dialogic.com/webhelp/img1010/10.5.2/webhelp/sip_m_line.htm> on Jul. 27, 2013. (Year: 2013).*

Camarillo, G. et al "Grouping of Media Lines in the Session Description Protocol (SDP)," Network Working Group, Request for Comments 3338, Dec. 2002, 21 pages.

Rosenberg, J et al., "An Offer/Answer Model with the Session Description Protocol (SDP)," Network Working Group, Request for Comments: 3264, Obsoletes: 2543, Jun. 2002, 26 pages.

Greevenbosch, B., and Y. Hui, "Signal 3D Format; draft-greevenbosch-mmusic-sdp-3d-format-01," Internet Engineering Task Force, Internet Society, XP015088249, Oct. 22, 2012, 27 pages.

Handley, M. et al., "SDP: Session Description Protocol," Network Working Group, Request for Comments 4566, Obsoletes: 2327, 3266, Jul. 2006, 49 pages.

International Search Report of the ISA issued in International application No. PCT/SE2013/051187, dated Jun. 26, 2014, 3 pages.

International Preliminary Report on Patentability of the ISA issued in International application No. PCT/SE2013/051187, dated Apr. 12, 2016, 11 pages.

* cited by examiner

SIGNALLING ASSYMETRIC MEDIA CAPABILITIES

CROSS REFERENCE TO RELATED APPLICATION(S)

This application is a 35 U.S.C. § 371 National Phase Entry Application from PCT/SE2013/051187, filed Oct. 9, 2013, designating the United States, the disclosure of which is incorporated by reference.

TECHNICAL FIELD

Embodiments presented herein relate to signalling asymmetric media capabilities in general and particularly to a method, a device, a computer program, and a computer program product for signalling asymmetric media capabilities using session description protocol (SDP) signalling.

BACKGROUND

Three dimensional (3D) Video or 3D TV has gained increasing momentum in recent years. A number of standardization bodies (the International Telecommunication Union, ITU, the European Broadcasting Union, EBU, the Society of Motion Picture and Television Engineers, SMPTE, the Moving Picture Experts Group, MPEG, and the Digital Video Broadcasting, DVB, suite of internationally accepted open standards for digital television. and other international groups (e.g. the Digital TV Group, DTG, and the Society of Cable Telecommunications Engineers, SCTE), are working toward standards for 3D TV or Video. Quite a few broadcasters have launched or are planning to launch public Stereoscopic 3D TV broadcasting.

Several 3D video coding formats have been proposed in the 3D video community so far. Examples include, but are not limited to: stereoscopic 3D, Video plus Depth (V+D), Multiview Video (MW), Multiview Video plus Depth (MVD), Layered Depth Video (LDV), Depth Enhanced Video, frame-packed side-by-side, frame-packed top-bottom, full resolution per view formats, frame interleaving, row-interleaving, multiview video coding (MVC), multiview video coding extension of high efficient video coding (MV-HEVC) and 3D-HEVC, where the three last ones are multi-view and 3D codecs developed or under development by the joint JCT-VC and JCT-3V standardization groups in MPEG/VCEG.

Apart from broadcasted television and cinema, 3D video is also being considered in other video services such as video conferencing and mobile video calls. 3D video conferencing may be enabled in many different forms. To this effect, 3D equipment such as stereo cameras and 3D displays have been deployed. 3D video or 3D experience commonly refers to the possibility of, for a viewer, getting the feeling of depth in the scene or, in other words, to get a feeling for the viewer to be in the scene. In technical terms, this may generally be achieved both by the type of capture equipment (i.e. the cameras) and by the type of rendering equipment (i.e. the display) that are deployed in the system.

A commonly used way to negotiate media capabilities (i.e., the ways by which a media stream may be sent and/or received by a client) between the clients before setting up a video conference call is to use the Session Description Protocol (SDP).

SDP negotiation is specified in IETF RfC 3264; "An Offer/Answer Model with the Session Description Protocol (SDP)," June 2002, which describes an offer/answer model with SDP. The specification defines a mechanism where two clients can make use of SDP to arrive at a common view of a multimedia session between them. In the model, one client offers the other client(s) a description of the desired session from their perspective, and the other client(s) answers with the desired session from their perspective. The offer/answer model can be implemented using protocols such as the Session Initiation Protocol (SIP).

In general terms, the session description protocol (SDP) is a protocol used for describing multimedia sessions for the purposes of session announcement, session invitation, and other forms of multimedia session initiation. SDP messages may be used for negotiating media capabilities during setup of a video conferencing session.

In general terms, an SDP session is described in an SDP message by a series of fields, one per line, where the form of each field is as follows:

<character>=<value> where <character> is a single case character and <value> is structured text whose format depends upon attribute type. A typical SDP offer for sending audio and video may be formulated as follows:

v=0
o=C-A 2890844526 2890844526 IN IP4 host.anywhere.com
s=
c=IN IP4 host.anywhere.com
t=0 0
m=audio 49170 RTP/AVP 0
a=rtpmap:0 PCMU/8000
a=sendrecv
m=video 51372 RTP/AVP 100
a=rtpmap:100 H264/90000
a=fmtp:100    profile-level-id=42c01f;packetization-mode=1
a=sendrecv where v is the version number of SDP (shall be O), O is the originator, in the present example a client with identity "C-A", and session identifier, s the session name, t is a timing description, m is the media name and transport address, and a is a media attribute line. A media description starts with an "m=" field and is terminated by either the next "m=" field or by the end of the session description. The words in the "m=" field value describe in order the media type, transport port, transport protocol and media format description. When RTP (Real-time Transport Protocol) is used, as in the above example, the media format description contains the RTP payload type number(s). If dynamic payload type numbers are used, the "a=rtpmap" attribute is used to map a media encoding name to the stream. Further, the "a=fmtp" attribute may be used to specify format parameters.

The last attribute value in the media descriptions in the above example describes the direction of the current media description. Possible directions are sendonly, recvonly, sendrecv, or inactive.

The document IETF Internet-Draft "Signal 3D format," October 2012, has introduced signalling of 3D formats in SDP. The 3D signalling is carried out by adding a new attribute to the SDP:

a=3dFormat:<Format Type><Component Type> where Format Type is one of the following 3D video formats; "FP" (Frame Packing), "SC" (Simulcast), "2DA" (2D+auxiliary, e.g. depth maps) and Component Type includes view components "D" (Depth map), "L" (Left), "R" (Right), "SbS" (Side by side) and "TaB" (Top and Bottom).

In case the 3D representation is carried in multiple streams a grouping mechanism is used to group the 3D views.

Commonly, if multiple media streams of the same media type are present in an SDP offer, it would mean that the offering client wishes to send (and/or receive) multiple media streams of that media type at the same time.

A typical SDP media negotiation between two clients may commonly involve the following signalling, which may define an offer/answering model. A first client (the offering client) initializes the SDP negotiation by creating an SDP offer from its media capabilities. The SDP offer is sent to a second client (the answering client). The second client reverses the direction of the media description, filters the received SDP and keeps the lines that match its own media capabilities, thus generating an SDP answer. If a media description for a media stream is not supported it should be disabled by the second client setting the port number of the corresponding m-line to O (zero) and removing the attributes in the media description. In this respect, an m-line is a line in the SDP message comprising an "m=" field. Thus, according to the above example, one example of an m-line is:

m=audio 49170 RTP/AVP 0

An m-line may not be deleted from the SDP message. This is to allow accessing of the m-lines at a certain absolute position. The SDP answer is sent to the first client. If the SDP answer contains an m-line with a non-zero port the media session can be started.

Although it is possible to continue the negotiation if a media format acceptable for both clients is not found during this process, for example by the offering client creating and sending a further SDP offer with a further media description, conference systems in practice do not always implement this.

Further, although it is possible to signal a number of different 3D video formats using the mechanism proposed in the document IETF Internet-Draft "Signal 3D format," October 2012, this document does not specify how to proceed in case asymmetric configurations are desired.

Hence, there is still a need for an improved signalling of media capabilities.

SUMMARY

An object of embodiments herein is to provide improved signalling of media capabilities.

The inventor of the enclosed embodiments have discovered that one issue with the existing mechanisms for signalling media capabilities is that SDP is not well designed for negotiating asymmetric 2D video and 3D video capabilities for sending and/or receiving 2D video and/or 3D video. The inventor of the enclosed embodiments have discovered that current SDP signalling is not well designed for situations where the negotiation should be accomplished in one single round and provide a possibility to provide fall back options to legacy clients.

For example, the inventor of the enclosed embodiments have realized that one issue with SDP and the above outlined offer/answering model concerns the definition of the directions used; namely the directions sendonly, recvonly and sendrecv, as defined in SDP. For example, if the capability of the offering client is sendonly X and recvonly X, and the capability of the answering client is sendrecv X, where X may be a 2D or 3D video format, the clients do not automatically reach a conclusion regarding which formats to be used for sending and/or receiving media streams by following signalling of the above outlined offer/answering model. Thus, a client with sendrecv 2D capability may, or perhaps even will, not be able to set up a connection with a client that has the sendonly 2D video and recvonly 2D video capabilities. Henceforth, it is troublesome to signal asymmetric 2D video and 3D video capabilities if it is desired to be able to fall back to sending and receiving 2D video. Moreover, since some SDP attributes used for 3D video are not defined for legacy non-3D clients only obeying the SDP protocol, such client would not understand the SDP attributes used for 3D video. If an attribute is unknown it is today not defined if the entire m-line should be disabled or if the m-line could be accepted but with omitting the 3D video format.

A particular object is therefore to provide signalling of asymmetric media capabilities.

According to a first aspect there is presented a method for signalling asymmetric media capabilities using session description protocol, SDP, signalling. The method is performed by a first electronic device. The method comprises acquiring media capabilities for at least one of sending media streams and receiving media streams by the first electronic device. The method comprises generating an SDP offer comprising media descriptions for at least one media stream based on the acquired media capabilities. At least one media stream in the SDP offer is represented by at least two media descriptions. The at least two media descriptions represent asymmetric media capabilities in relation to each other. The method comprises sending a first SDP message comprising the generated SDP offer to a second electronic device.

According to a second aspect there is presented a method for signalling asymmetric media capabilities using session description protocol, SDP, signalling. The method is performed by a second electronic device. The method comprises receiving a first SDP message comprising an SDP offer from a first electronic device. The SDP offer comprises media descriptions for at least one media stream. The media descriptions are based on media capabilities for at least one of sending media streams and receiving media streams by the first electronic device. At least one media stream in the SDP offer is represented by at least two media descriptions. The at least two media descriptions represent asymmetric media capabilities in relation to each other. The method comprises generating an SDP answer from the SDP offer by disabling at least one media description in the SDP offer for at least one of the at least one media streams. The method comprises sending a second SDP message comprising the SDP answer to the first electronic device.

Advantageously this provides improved signalling of media capabilities.

Further advantageously this enables asymmetric signalling of media capabilities.

According to a third aspect there is presented an electronic device for signalling asymmetric media capabilities using session description protocol, SDP, signalling. The electronic device comprises a processing unit. The processing unit is arranged to acquire media capabilities for at least one of sending media streams and receiving media streams by the electronic device. The processing unit is arranged to generate an SDP offer comprising media descriptions for at least one media stream based on the acquired media capabilities. At least one media stream in the SDP offer is represented by at least two media descriptions. The at least two media descriptions represent asymmetric media capabilities in relation to each other. The processing unit is arranged to send a first SDP message comprising the generated SDP offer to a second electronic device.

According to a fourth aspect there is presented an electronic device for signalling asymmetric media capabilities using session description protocol, SDP, signalling. The electronic device comprises a processing unit. The processing unit is arranged to receive a first SDP message comprising an SDP offer from a first electronic device. The SDP offer comprises media descriptions for at least one media stream. The media descriptions are based on media capabilities for at least one of sending media streams and receiving media streams by the first electronic device. At least one media stream in the SDP offer is represented by at least two media descriptions. The at least two media descriptions represent asymmetric media capabilities in relation to each other. The processing unit is arranged to generate an SDP answer from the SDP offer by disabling at least one media description in the SDP offer for at least one of the at least one media streams. The processing unit is arranged to send a second SDP message comprising the SDP answer to the first electronic device.

According to a fifth aspect there is presented a 3D video conference system comprising at least one electronic device according to the third aspect and at least one electronic device according to the fourth aspect.

According to a sixth aspect there is presented at least one computer program for signalling asymmetric media capabilities using session description protocol, SDP, signalling. The at least one computer program comprises computer program code which, when run on an electronic device, causes the electronic device to perform a method according to at least one of the first aspect and the second aspect.

According to a seventh aspect there is presented a computer program product comprising a computer program according to the sixth aspect and a computer readable means on which the computer program is stored. The computer readable means may be non-volatile computer readable means.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the inventive concept will now be described, by way of non-limiting examples, references being made to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Features and/or steps drawn with dashed or dotted lines should be regarded as optional.

Figure 1:
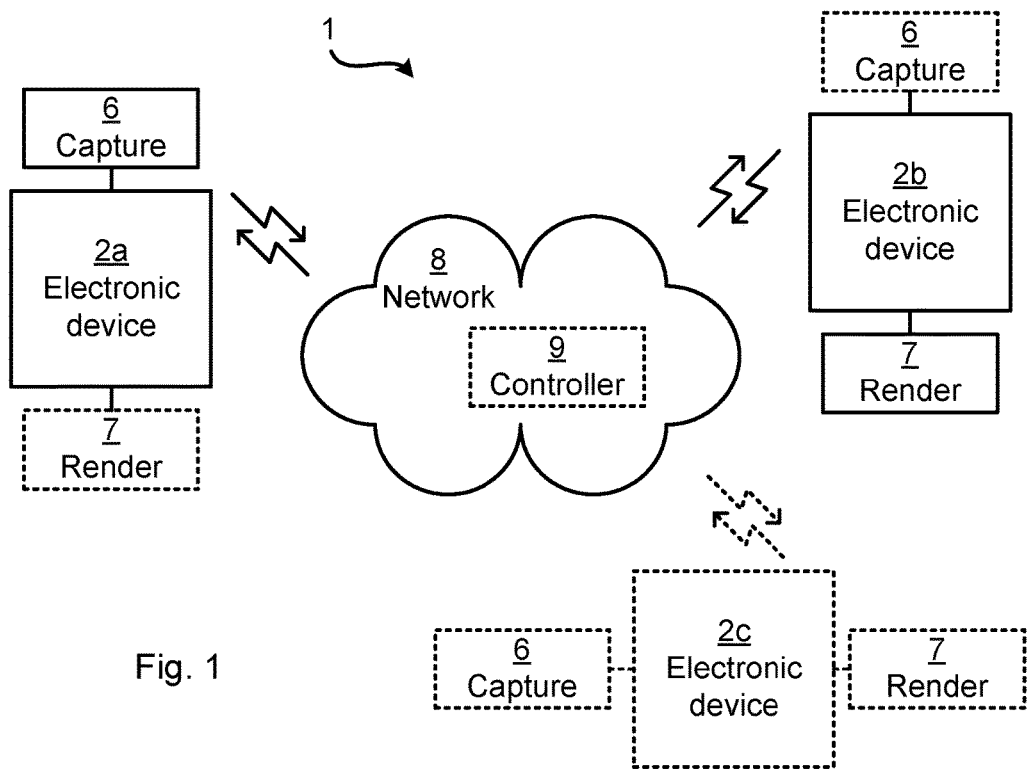
FIG. 1 is a schematic diagram illustrating a video communications system according to an embodiment.

FIG. 1 is a schematic diagram illustrating a video communications system 1 where embodiments presented herein can be applied. The video communications system 1 comprises a number of electronic devices 2a, 2b, 2c representing video conferencing client devices. The electronic devices 2a, 2b, 2c are operatively connected via a communications network 8.

Each electronic device 2a, 2b, 2c representing a video conferencing client device comprises, or is operatively connected to, a 3D and/or 2D video sequence capturing unit 6 (i.e. one or more cameras) and/or a 3D and/or 2D video sequence rendering unit 7 (i.e. a unit, such as a display, for rendering received video sequences) that require different video formats and codecs. As the skilled person understands this are just one example of a video communications system where the disclosed embodiments can be applied Thus, although only three electronic devices 2a, 2b, 2c representing video conferencing client devices are illustrated in FIG. 1, there may in practical situations be a large combination of electronic devices 2a, 2b, 2c representing video conferencing client devices with different 2D/3D equipment.

The video communications system 1 may comprise an electronic device representing a central controller 9. The central controller 9 may be arranged to control the communications between the electronic devices 2a, 2b, 2c representing video conferencing client devices. The central controller 9 may thus act as a video conferencing server and be used when connecting multiple clients. Tasks for a video conferencing server include, but are not limited to: setting up the video conference call between two or more clients, perform stream switching and/or mixing audio and video. These tasks may be handled by one central controller 9 or could be divided onto several such controllers.

It is to be understood by a person skilled in the art that the video acquired by the capturing unit 6 must not necessarily be captured; it may for instance be retrieved from stored media (for example as stored in the memory 4, see below) or generated by other means. Likewise, the video received by the rendering unit 7 must not necessarily be rendered; it may be for instance be stored on media (for example stored in the memory 4, see below), or redirected to another entity in the video communications system 1, or even discarded.

The inventive concept relate to enabling signalling asymmetric media capabilities. More particularly, the embodiments disclosed herein relate to signalling asymmetric media capabilities using session description protocol (SDP) signalling. In order to obtain signalling asymmetric media capabilities using SDP signalling there is provided electronic devices, methods performed by the electronic devices, computer programs comprising code, for example in the form of a computer program product, that when run on electronic devices, causes the electronic devices to perform the methods.

Figure 2A:
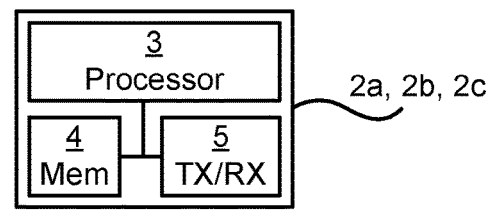
FIG. 2a is a schematic diagram showing functional modules of an electronic device according to an embodiment.

FIG. 2a schematically illustrates, in terms of functional modules, an electronic device 2a, 2b, 2c representing a video conferencing client device. The electronic device 2a, 2b, 2c may be part of a stationary computer, a laptop computer, a tablet computer, or a mobile phone. A processing unit 3 is provided using any combination of one or more of a suitable central processing unit (CPU), multiprocessor, microcontroller, digital signal processor (DSP), application specific integrated circuit (ASIC) etc., capable of executing software instructions stored in a computer program product 31a, 31b (as in FIG. 3). Thus the processing unit 3 is thereby preferably arranged to execute methods as herein disclosed. The electronic device 2a, 2b, 2c further comprises an input/output (I/O) interface 5 in the form of a transmitter (TX) and a receiver (RX), for communicating with other electronic devices over the communications network 8, with a capturing unit 6 and a display unit 7. Other components, as well as the related functionality, of the electronic device 2a, 2b, 2c are omitted in order not to obscure the concepts presented herein.

A 3D video conference system 1 may comprise at least two electronic devices 2a, 2b, 2c according to any one of the herein disclosed embodiments.

Figure 2B:
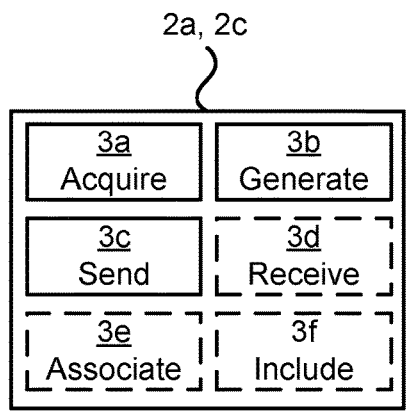
FIGS. 2b and 2c are schematic diagrams showing functional units of an electronic device according to embodiments.

FIG. 2b schematically illustrates functional units of the electronic device 2a, 2c; according to an embodiment the electronic device 2a, 2c comprises an acquiring unit 3a, a generating unit 3b, and a sending unit 3c, and optionally any of a receiving unit 3d, an associating unit 3e, and an including unit 3f.

Figure 2C:
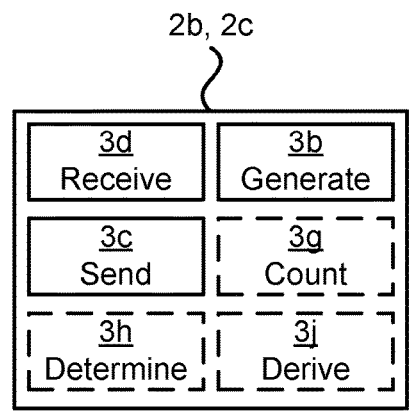

FIG. 2c schematically illustrates functional units of the electronic device 2b, 2C; according to an embodiment the electronic device 2b, 2c comprises a receiving unit 3d, a generating unit 3b, and a sending unit 3c, and optionally any of a counting unit 3g, a determining unit 3h, and a deriving unit 3j.

The functionality of each functional unit 3a-j will be further disclosed. In general terms, each functional unit 3a-j may be implemented in hardware or in software. The processing unit 3 may thus be arranged to from the memory 4 fetch instructions as provided by a functional unit 4a-j and to execute these instructions in order to perform methods as herein disclosed.

FIGS. 4, 5, 6, 7, and 8 are flowcharts illustrating embodiments of methods for signalling asymmetric media capabilities using SDP signalling.

Figure 4:
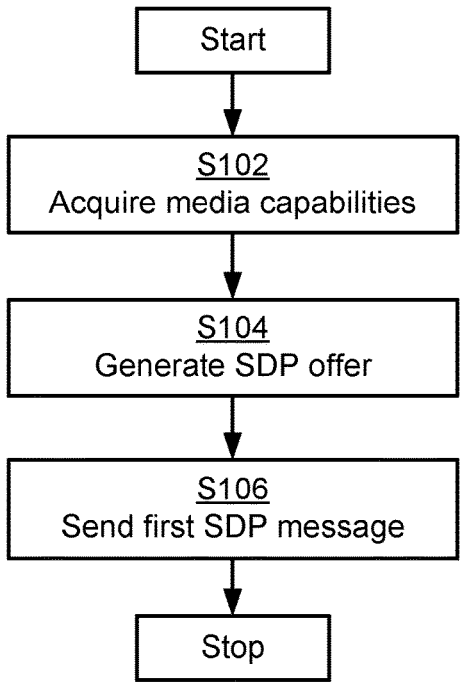
FIGS. 4, 5, 6, 7, and 8 are flowcharts of methods according to embodiments.
Figure 5:
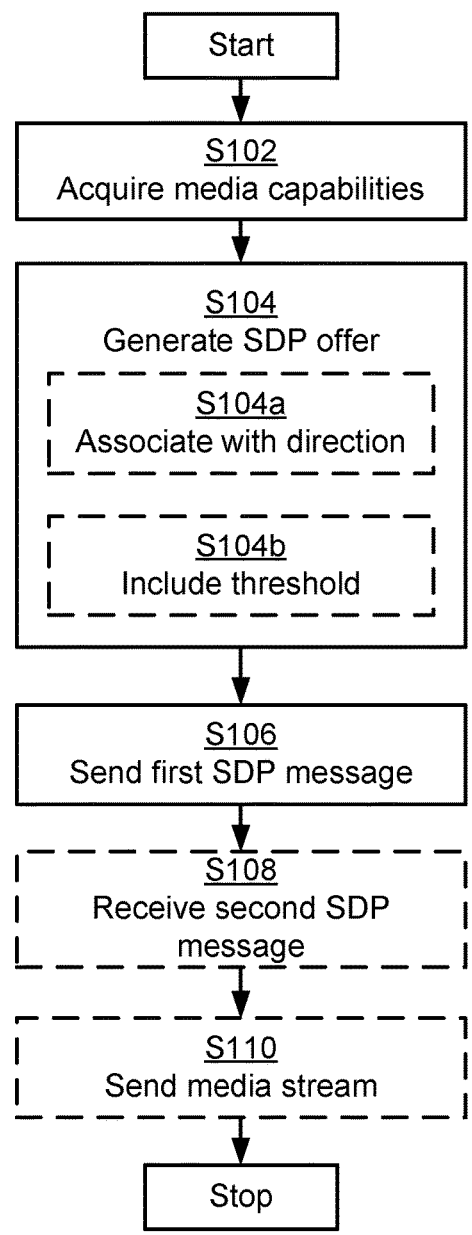
Figure 6:
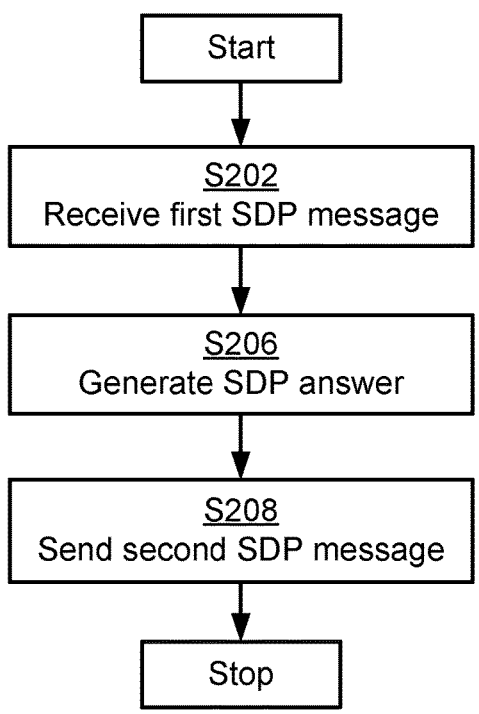
Figure 7:
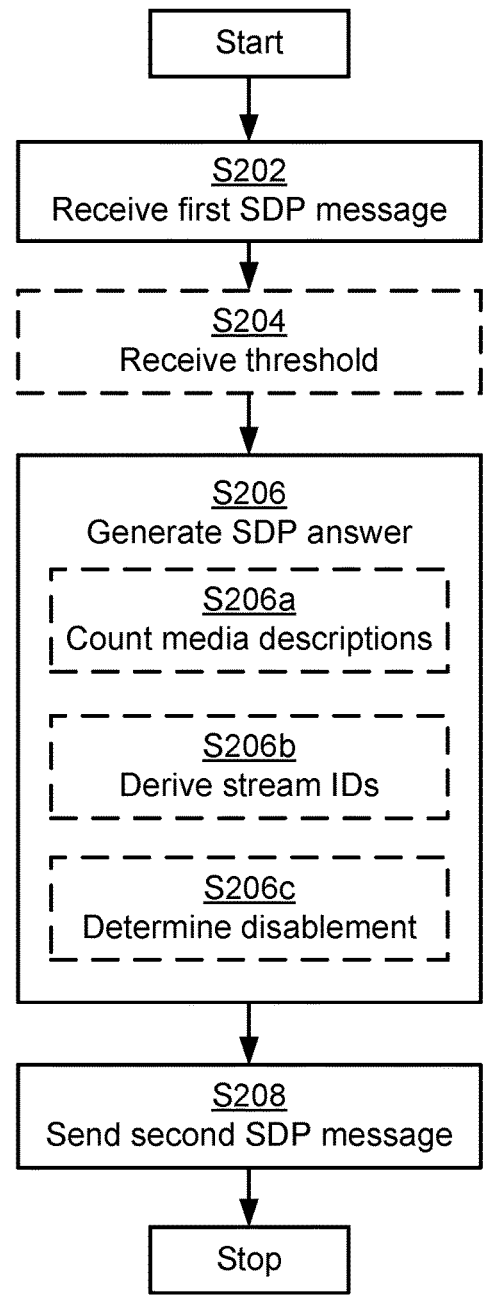

The methods of FIGS. 4 and 5 are performed by an electronic device 2a, 2C representing an offering video conferencing client device. The methods of FIGS. 6 and 7 are performed by an electronic device 2b, 2c representing an answering video conferencing client device.

Figure 3:
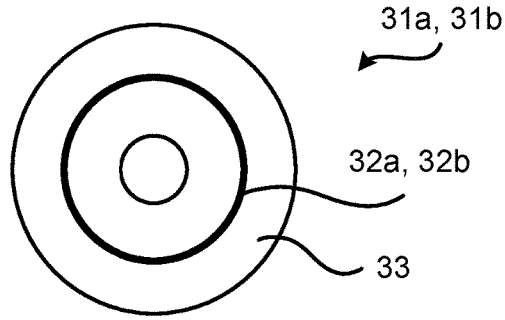
FIG. 3 shows one example of a computer program product comprising computer readable means according to an embodiment.

The methods are advantageously provided as computer programs 32a, 32b. FIG. 3 shows one example of a computer program product 31a, 31b comprising computer readable means 33. On this computer readable means 33, at least one computer program 32a, 32b can be stored. This at least one computer program 32a, 32b can cause the processing unit 3 of the electronic device 2a, 2b, 2c and thereto operatively coupled entities and devices to execute methods according to embodiments described herein. The at least one computer program 32a, 32b and/or computer program product 31a, 31b thus provides means for performing any steps as herein disclosed.

In the example of FIG. 3, the computer program product 31a, 31b is illustrated as an optical disc, such as a CD (compact disc) or a DVD (digital versatile disc) or a Blu-Ray disc. The computer program product 31a, 31b could also be embodied as a memory (RAM, ROM, EPROM, EEPROM) and more particularly as a non-volatile storage medium of a device in an external memory such as a USB (Universal Serial Bus) memory. Thus, while the at least one computer program 32a, 32b is here schematically shown as a track on the depicted optical disk, the at least one computer program 32a, 32b can be stored in any way which is suitable for the computer program product 31a, 31b.

The enclosed embodiments enable signalling of, for example, asymmetric 3D capabilities for sending (camera capabilities) and receiving (display capabilities) using SDP in a 3D video conference scenario with the possibility to fall back to 2D for legacy clients not understanding the 3D signalling. The enclosed embodiments are based on at the offering client in an SDP offer adding multiple m-lines for each intended media stream in order of preference. The enclosed embodiments are based on at the answering client filtering the incoming SDP offer before returning an SDP answer. Some of the enclosed embodiments are based on restricting the maximum number of media streams to be accepted for a certain media type and direction. Possible directions here are send or receive where the SDP attribute sendonly is counted as send; where the SDP attribute recvonly is counted as receive, and where the SDP attribute sendrecv is counted as both send and receive.

Hereinafter the first electronic device 2a will represent an offering client and the second electronic device 2b will represent an answering client. It is further assumed that at least one media stream is to be transmitted between the first electronic device 2a and the second electronic device 2b, as outlined above, in order for the at least one media stream to be transmitted, the first electronic device 2a and the second electronic device 2b needs to exchange media capabilities. The media capabilities are exchanged using SDP signalling.

A method for signalling asymmetric media capabilities using SDP signalling as performed by a first electronic device 2a will now be disclosed with references to the flowchart of FIG. 4.

In order to generate an SDP offer the first electronic device 2a needs to have access to its capabilities of sending and/or receiving media streams. The processing unit 3 of the first electronic device 2a is therefore arranged to, in a step S102, acquire media capabilities for at least one of sending media streams and receiving media streams by the first electronic device 2a. The acquiring may be performed by executing functionality of the acquiring unit 3a. The computer program 32a and/or computer program product 31a may thus provide means for this acquiring.

The first electronic device 2a may then generate the SDP offer. The processing unit 3 of the first electronic device 2a is thus arranged to, in a step S104, generate an SDP offer. The generating may be performed by executing functionality of the generating unit 3b. The computer program 32a and/or computer program product 31a may thus provide means for this generating. The SDP offer comprises media descriptions for at least one media stream based on the acquired media capabilities. At least one media stream in the SDP offer is represented by at least two media descriptions. The at least two media descriptions represent asymmetric media capabilities in relation to each other. The asymmetric media capabilities concern media capabilities for sending and/or receiving media streams. The at least two media descriptions thus have different acquired media capabilities. Further examples of asymmetric media capabilities will be provided below. In general terms, an SDP message comprises a series of fields, one per line, where the form of each field is as follows:

<character>=<value> where <character> is a single case character and <value> is structured text whose format depends upon attribute type. An SDP offer generated by the first electronic device 2a may, for example, take the following form:

m=video 12345 RTP/AVP 102
a=rtpmap:102 H261/90000
a=sendonly
m=video 12345 RTP/AVP 104
a=rtpmap:104 H261/90000
a=recvonly
m=video 12345 RTP/AVP 108
a=rtpmap:108 H261/90000
a=sendrecv An m-line is a line in the SDP message comprising an "m=" field. Thus, according to the above example there are three m-lines; the m-line associated with the sendonly attribute is:

m=video 12345 RTP/AVP 102

Further examples of SDP offers will be provided below.

Once generated, the SDP offer may be transmitted to the second electronic device 2b. The processing unit 3 of the first electronic device 2a is therefore arranged to, in a step S106, send a first SDP message comprising the generated SDP offer to a second electronic device 2b. The sending may be performed by executing functionality of the sending unit 3c. The computer program 32a and/or computer program product 31a may thus provide means for this sending. The first SDP message may be sent via the transmitter TX of the I/O interface 5. As the skilled person understands, the SDP offer may likewise be transmitted to at least one third electronic device 2C.

References are now made to the flowchart of FIG. 5. FIG. 5 discloses further embodiments of methods for signalling asymmetric media capabilities using SDP signalling as performed by the first electronic device 2a.

Once the SDP offer has been sent to the second electronic device 2a, the second electronic device 2a generates and sends an SDP answer. Further details related thereto will be disclosed below with references to the flowcharts of FIGS. 6 and 7.

Hence, the first electronic device 2a may receive an SDP answer from the second electronic device 2b. According to an embodiment the processing unit 3 of the first electronic device 2a is therefore arranged to, in an optional step S108, receive a second SDP message. The receiving may be performed by executing functionality of the receiving unit 3d. The computer program 32a and/or computer program product 31a may thus provide means for this receiving. The second SDP message may be received via the receiver RX of the I/O interface 5. As the skilled person understands, an SDP answer may likewise be received from at least one third electronic device 2c. The second SDP message comprises an SDP answer from the second electronic device 2b. In the SDP answer at least one media description in the SDP offer for at least one of the at least one media streams has been disabled. An SDP answer received by the first electronic device 2a corresponding to the above SDP offer may, for example, take the following form:

m=video 0 RTP/AVP 102
m=video 0 RTP/AVP 104
m=video 12345 RTP/AVP 108
a=rtpmap:108 H261/90000
a=sendrecv The processing unit 3 of the first electronic device 2a is arranged to, in an optional step S108, send the at least one media stream to the second electronic device 2b in a media description being in accordance with the SDP answer. The sending may be performed by executing functionality of the sending unit 3c. The computer program 32a and/or computer program product 31a may thus provide means for this sending.

There may be different ways to generate the SDP offer (as in step S104). Different embodiments relating thereto will now be described in turn.

According to an embodiment the step S104 of generating the SDP offer involves the processing unit 3 of the first electronic device 2a to, in an optional step S104a, associate each media description with a direction. The associating may be performed by executing functionality of the associating unit 3e. The computer program 32a and/or computer program product 31a may thus provide means for this associating. The direction is one from send only, receive only, and both send and receive. According to an embodiment each direction is indicated by an SDP attribute. The SDP attribute sendonly (in an SDP answer or offer written as "a=sendonly") is used to indicate the direction send only. The SDP attribute recvonly (in an SDP answer or offer written as "a=recvonly") is used to indicate the direction receive only. The SDP attribute sendrecv (in an SDP answer or offer written as "a=sendrecv") is used to indicate both the directions send only and receive only.

According to an embodiment the step S104 of generating the SDP offer involves the processing unit 3 of the first electronic device 2a to, in an optional step S104b, include a predetermined threshold parameter T in the first SDP message as at least one of SDP metadata and an SDP media description attribute. The including may be performed by executing functionality of the including unit 3f. The computer program 32a and/or computer program product 31a may thus provide means for this including. The predetermined threshold parameter T determines a number of media descriptions to be enabled or disabled by the second electronic device 2b. Further properties of the predetermined threshold parameter T and how to include it in the SDP offer will be disclosed below.

A method for signalling asymmetric media capabilities using SDP signalling as performed by a second electronic device 2b will now be disclosed with references to the flowchart of FIG. 6.

The processing unit 3 of the second electronic device 2b is arranged to, in a step S202, receive a first SDP message comprising an SDP offer from the first electronic device 2a. The receiving may be performed by executing functionality of the receiving unit 3d. The computer program 32b and/or computer program product 31b may thus provide means for this receiving. The first SDP message may be received via the receiver RX of the I/O interface 5. The SDP offer may have been generated as outlined in step S104 above. In particular, the SDP offer comprises media descriptions for at least one media stream. The media descriptions are based on media capabilities for at least one of sending media streams and receiving media streams by the first electronic device 2a. At least one media stream in the SDP offer is represented by at least two media descriptions. The at least two media descriptions represent asymmetric media capabilities in relation to each other.

Once the second electronic device 2b has received the SDP offer it may generate an SDP answer in response thereto. The processing unit 3 of the second electronic device 2b is thus arranged to, in a step S206, generate an SDP answer from the SDP offer. The generating may be performed by executing functionality of the generating unit 3b. The computer program 32b and/or computer program product 31b may thus provide means for this generating. The SDP offer is generated by disabling at least one media description in the SDP offer for at least one of the at least one media streams. For example, once receiving an SDP offer according to the example above, comprising the SDP attributes sendonly, recvonly, and sendrecv the second electronic device 2b may, for example, generate the SDP answer by disabling m-lines relating to the SDP attributes sendonly and recvonly, thus arriving at the SDP answer according to the example above.

The SDP answer may then be transmitted to the first electronic device 2b. The processing unit 3 of the second electronic device 2b is therefore arranged to, in a step S208, send a second SDP message comprising the SDP answer to the first electronic device 2b. The sending may be performed by executing functionality of the sending unit 3c. The computer program 32b and/or computer program product 31b may thus provide means for this sending. The second SDP message may be sent via the transmitter TX of the I/O interface 5. As the skilled person understands, the SDP answer may likewise be transmitted to at least one third electronic device 2C.

References are now made to the flowchart of FIG. 7. FIG. 7 discloses further embodiments of methods for signalling asymmetric media capabilities using SDP signalling as performed by the second electronic device 2b.

There may be different ways to generate the SDP answer (as in step S206). Different embodiments relating thereto will now be described in turn.

According to an embodiment each media description is associated with a media format and a direction. For such cases the step S206 of generating the SDP answer may involve the processing unit 3 of the second electronic device 2b to, in an optional step S206a, count the number of enabled media descriptions in the SDP offer for each combination of media format and direction. The counting may be performed by executing functionality of the counting unit 3g. The computer program 32b and/or computer program product 31b may thus provide means for this counting. Details of the direction have been disclosed above with reference to step S104a.

According to an embodiment the step S206 of generating the SDP answer may involve the processing unit 3 of the second electronic device 2b to, in an optional step S206b, derive stream IDs from a transport port of the at least two media descriptions in the SDP offer. The deriving may be performed by executing functionality of the deriving unit 3j. The computer program 32b and/or computer program product 31b may thus provide means for this deriving.

According to an embodiment the step S206 of generating the SDP answer may involve the processing unit 3 of the second electronic device 2b to, in an optional step S206c, determine disablement of a media description based on the counted number of enabled media descriptions and a predetermined threshold parameter T. Further properties of the predetermined threshold parameter T and how it may be included it in the SDP offer will be disclosed below. The determining may be performed by executing functionality of the determining unit 3h. The computer program 32b and/or computer program product 31b may thus provide means for this determining.

There may be different ways to determine the predetermined threshold parameter T. The predetermined threshold parameter T may be received from the first electronic device 2a. According to an embodiment the processing unit 3 of the second electronic device 2b is, in an optional step S204, arranged to receive the predetermined threshold parameter in at least one of SDP metadata and an SDP media description attribute. The receiving may be performed by executing functionality of the receiving unit 3d. The computer program 32b and/or computer program product 31b may thus provide means for this receiving. The SDP metadata and an SDP media description attribute may be received via the receiver RX of the I/O interface 5.

Embodiments relating to further details of signalling asymmetric media capabilities using SDP signalling will now be disclosed.

The media streams may be audio streams or video streams, such as 2D video streams or 3D video streams. A 3dFormat attribute, such as an SDP attribute in the form "a=3dFormat", may be used to signal the 3D video format. The media description may comprise a media encoding name field. A 3D video format is signaled in the media encoding name field. The 3D video format may be a frame-packed side-by-side format, a frame-packed top-bottom format, a full resolution per view format, a frame interleaving format, a row-interleaving format, a video plus depth format, a multiview video coding, MVC, format, a multiview video coding extension of high efficient video coding, MV-HEVC, format, and a 3D high efficient video coding, or a 3D-HEVC, format.

As noted above, the SDP offer comprises media descriptions for at least one media stream. In general, the SDP offer may comprise at least two different media streams, where at least one of the at least two different media streams is associated with at least two media descriptions. The SDP offer may then further comprise stream IDs to associate each one of the at least two different media streams with its respective at least two media descriptions.

Six overall embodiments related to certain aspects of signalling asymmetric media capabilities using SDP signalling in accordance with the above disclosed methods with references to FIGS. 4, 5, 6, and 7 will now be disclosed. Hence, any feature disclosed below may be readily associated with any features disclosed above with references to FIGS. 4, 5, 6, and 7.

A first overall embodiment is based on extra m-lines being added to the SDP offer so as to indicate all possible 2D and 3D capabilities. Media streams that are not to be used may then be discarded. The 3D capabilities are signaled as a codec in the media encoding name field.

According to the first overall embodiment asymmetric sending and receiving capabilities for 2D video and 3D video are signaled using SDP by the first electronic device 2a adding multiple m-lines to the SDP offer in the order of preference (i.e. 3D video prior to 2D video), as outlined in any of steps S104, S104a, and S104b above, and by the second electronic device 2b keeping track on the number of enabled m-lines from the offering side in the SDP negotiation using a counter for each media type (video, audio, etc.) and direction (sending or receiving, where sendrecv is counted for both), as outlined in any of steps S206, S206a, and S206b above.

Each media description in the first electronic device's 2a representation of its capabilities, henceforth referred to as the capability of the capability set, has a threshold T set for it. If the threshold is not explicitly set it may inferred to be an infinitely high number, or a sufficiently large number. The same sets of capability sets may be present at the first electronic device 2a and the second electronic device 2b.

During filtering of an incoming SDP message, and hence during generation of the SDP answer, if an m-line of the received SDP is matching a capability of the capability set of the second electronic device 2b in terms of media type and direction, and the number of enabled m-lines further up in the received SDP offer matching the capabilities in the capability set in terms of media type and direction is larger than the threshold T, then the current m-line of the received SDP offer is disabled by setting its port to O. In pseudo code the step of determining if an m-line should be disabled (as outlined in any of the generating steps S206, S206a, and S206b above) may be formulated as outlined below:

```
for each enabledmLine in received SDP offer:
    found = false
    for each localCapability in capability set when not
    found:
        if mediaType and direction is the same for
        enabledmLine and localCapability
            found = true
            enabledmLineCounter[mediaType][direction]+=1
            if (enabledmLineCounter[mediaType][direction]
            > localCapability.T):
                disable enabledmLine by setting port to 0
```

Figure 8:
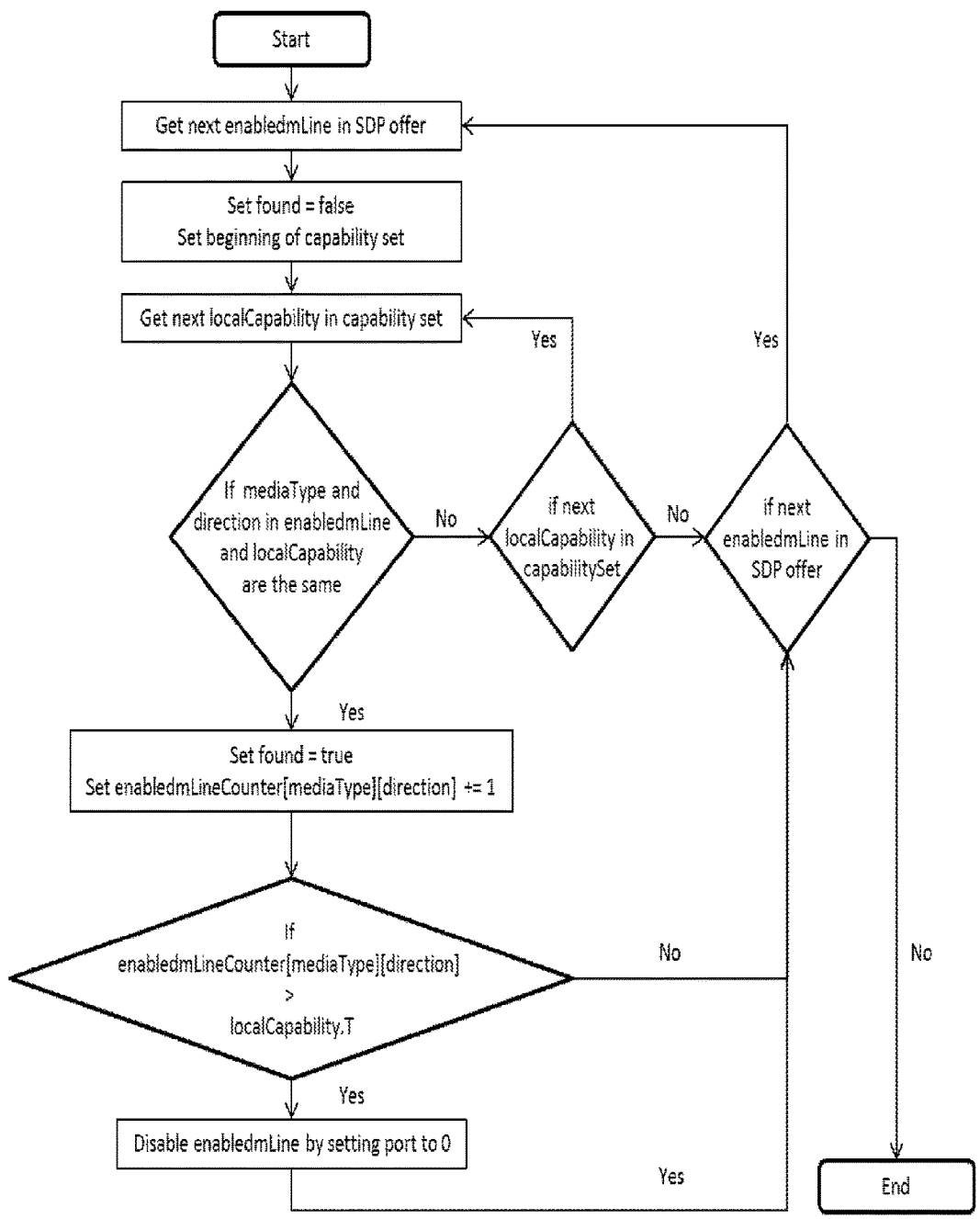

Steps following such pseudo code are outlined in the flowchart of FIG. 8 and should be performed as the last step in the filtering of the received SDP offer. The reversing of directions (i.e., where "sendonly" is reversed to "recvonly", and vice versa) as well as filtering media codecs and all other means to disable m-lines should be considered prior to the m-line disabling mechanism. This mechanism allows all combinations of sending and receiving 2D and 3D capabilities to be possible, including the fallback to sending and receiving 2D with the "a=sendrecv" attribute.

The step of determining if an m-line should be disabled may be preceded by a step of removing additional media formats. For example, assume a first client supporting the following media formats for a specific media description which is sent in an SDP offer to a second client: H264, MPEG4, H263. Assume further that client B supports the following media formats in its capabilities for the corresponding media description: MPEG4, H263. When the second client filters the SDP offer as sent by the first client, the formats not supported by the second client are discarded. Hence the second client disables non-supported media formats. In the present example H264 is disabled. The formats MPEG4 and H263 thus remain. According to the embodiments presented herein the first presented alternative is to be chosen (i.e., MPEG4). The second client thus chooses MPEG4 and disables H263 when generating the SDP answer.

In case the above disclosed counters and threshold would not be used, all signaled capabilities in the SDP offer that have a match in the answering client would have to be set up, which is not the intent of the offering client.

As a non-limiting example five different media descriptions with corresponding SDP syntax where H.264 is used for coding video are defined.

For simplicity each media description has been replaced with a label in the example. In the example below H264SbS3D is a value only understood by the 3D signalling mechanism as enabled by the herein disclosed embodiments for signalling asymmetric media capabilities using SDP signalling and here would mean that the video is to be frame-packed side-by-side and encoded with H.264. As the skilled person would understands, other values could be used to indicate other codecs and 3D video formats, including but not limited to, frame-packed top-bottom, full resolution per view formats, frame interleaving, row-interleaving, video plus depth, MVC, MV-HEVC and 3D-HEVC video formats.

Send3D:
m=video 12345 RTP/AVP 100
a=rtpmap:100 H264SbS3D/90000
a=fmtp:100    profile-level-id=42c01f;packetization-mode=1
a=sendonly
Recv3D:
m=video 12345 RTP/AVP 102
a=rtpmap:102 H264SbS3D/90000
a=fmtp:102    profile-level-id=42c01f;    packetization-mode=1
a=recvonly
Send2D:
m=video 12345 RTP/AVP 104
a=rtpmap:104 H264/90000
a=fmtp:104    profile-level-id=42c01f;    packetization-mode=1
a=sendonly
Recv2D:
m=video 12345 RTP/AVP 106
a=rtpmap:106 H264/90000
a=fmtp:106    profile-level-id=42c01f;    packetization-mode=1
a=recvonly
SendRecv2D:
m=video 12345 RTP/AVP 108
a=rtpmap:108 H264/90000
a=fmtp:108    profile-level-id=42c01f;    packetization-mode=1
a=sendrecv A legacy client C-L only capable of sending and receiving 2D video may, for example, only have the following video capability:
Cap GroupSendRecv2D:
SendRecv2D
while a client C-A capable of sending and receiving 2D video and 3D video could have the following video capabilities:
CapGroupSendRecv3D:
Send3D
Recv3D
Send2D, T=1
Recv2D, T=1
SendRecv2D, T=2

The threshold T is explicitly set for the three last capabilities in the capability set. For the two first capabilities the threshold T has been omitted and is assigned a sufficiently large number" For these two capabilities the m-line disabling mechanism will not be applied.

If client C-A starts the SDP negotiation it will send all of its capabilities in the CapGroupSendRecv3D set as an SDP offer to client C-L. Since client C-L does not support the media codec H264SbS3D it will disable the m-lines corresponding to the capabilities Send3D, Recv3D and since it does only have the direction attribute "a=sendrecv" it will also disable the m-lines corresponding to Send2D and Recv2D but keep the m-line corresponding to SendRecv2D and create an SDP answer with only the SendRecv2D capability:
   m=video 0 RTP/AVP 100
   m=video 0 RTP/AVP 102
   m=video 0 RTP/AVP 104
   m=video 0 RTP/AVP 106
   m=video 12345 RTP/AVP 108
   a=rtpmap:108 H264/90000
   a=fmtp:108 profile-level-id=42c01f; packetization-mode=1
   a=sendrecv If instead client C-L starts the SDP negotiation it will send the SendRecv2D capability to client C-A in the SDP offer. Client C-A matches this capability with its capabilities. The first match is the last one and since the number of enabled m-lines for that media type and each direction is not larger than T=2 the m-line is not disabled. Thus, the SendRecv2D capability is kept and client C-A responds with an SDP answer containing only the SendRecv2D capability:
   m=video 12345 RTP/AVP 108
   a=rtpmap:108 H264/90000
   a=fmtp:108 profile-level-id=42c01f; packetization-mode=1
   a=sendrecv Another client, client C-B, has a 3D screen but only a 2D camera and thus the capabilities to send 2D and receive 2D and 3D corresponding to the following video capabilities:
   CapGroupSend2DRecv3D:
   Send2D
   Recv3D
   SendRecv2D, T=1

If an SDP negotiation is made between client C-B and client C-L, either one initializing it, it will result in the same negotiated SDP as was the outcome between client C-A and client C-L.

If client C-B initializes an SDP negotiation with client C-A, client C-B will send an SDP offer with media descriptions representing the capabilities in the CapGroupSend2DRecv3D set. When client C-A receives the SDP offer, client C-C first reverses the direction of the media descriptions (as disclosed above), and then starts to match it with the capabilities of client C-C. Client C-C keeps the Send3D (renamed after reverting directions) of the received SDP since it matches and increases the send counter by 1. Client C-C also keeps the Recv2D (renamed after reverting directions) since it matches and increases the receive counter by 1. The last m-line corresponding to SendRecv2D matches first Send2D (media type and direction are the same), thus increasing the send counter by 1 to 2, then Recv3D (media type and direction are the same), thus increasing the receive counter by 1 to 2, then SendRecv2D, thus increasing both send and receive counters by 1 to 3. Since any one of these counters are larger than threshold T=2 for the matching capability, SendRecv2D is disabled and client C-A responds with an SDP answer containing Send3D and Recv2D which is the reverse of client C-B's capabilities. The media session can thus be started:
   m=video 12345 RTP/AVP 102
   a=rtpmap:102 H264SbS3D/90000
   a=fmtp:102 profile-level-id=42c01f; packetization-mode=1
   a=sendonly
   m=video 12345 RTP/AVP 104
   a=rtpmap:104 H264/90000
   a=fmtp:104 profile-level-id=42c01f; packetization-mode=1
   a=recvonly
   m=video 0 RTP/AVP 108

If client C-A initializes an SDP negotiation with client C-B, client C-A will send an SDP offer with the capabilities in the CapGroupSendRecv3D. Client C-B reverses the directions of the media descriptions in the received SDP offer and begins to filter the SDP offer. First client C-B disables the second and third m-line in the offered SDP since client C-B does not support encoder name H264SbS3D in combination with the sendonly attribute and the encoder name H264 in combination with the recvonly attribute. Then, since client C-B can match Recv3D (renamed after reverting directions) client C-B keeps this m-line and increases the receive counter with 1. Client C-B also keeps Send3D (renamed after reverting directions) and increases the send counter with 1. The last m-line corresponding to SendRecv2D matches first Send2D (media type and direction are the same), thus increasing the send counter by 1 to 2, and then Recv3D (media type and direction are the same), thus increasing the receive counter by 1 to 2. Since any one of these counters are larger than the threshold T=1 for the matching capability, SendRecv2D is disabled and client C-B responds with an SDP answer containing m-lines corresponding to Send2D and Recv3D:
   m=video 12345 RTP/AVP 100
   a=rtpmap:100 H264SbS3D/90000
   a=fmtp:100 profile-level-id=42c01f; packetization-mode=1
   a=recvonly
   m=video 0 RTP/AVP 102
   m=video 0 RTP/AVP 104
   m=video 12345 RTP/AVP 106
   a=rtpmap:106 H264/90000
   a=fmtp:106 profile-level-id=42c01f; packetization-mode=1
   a=sendonly
   m=video 0 RTP/AVP 108

Another client, client C-C, has a 3D camera but no 3D display, and thus the ability to send 2D video and 3D video but only to receive 2D video, which thus corresponds to the capability set:
   CapGroupSend3DRecv2D:
   Send3D
   Recv2D
   SendRecv2D, T=1

Client C-C gets a similar, but reversed negotiation procedure as client C-B when negotiating SDP with client C-L and client C-A.

If client C-C initializes an SDP negotiation with client C-B, client C-C will send an SDP offer with the capabilities in the CapGroupSend3DRecv2D. Client C-B reverses the directions of the media descriptions in the received SDP offer and begins to filter the SDP offer. Since client C-B can match both Send2D and Recv3D, client C-B keeps these lines (in the reversed SDP offer) and increases both send and receive counters to 1. SendRecv2D in the offered SDP matches first Send2D (after reversing the directions) and increases the send counter by 1 to 2, then Recv3D (after reversing the directions) and increases the receive counter by 1 to 2, and finally SendRecv2D and increases both counters to 3. Since any one of the counters are larger than the threshold T=1 for the matching capability, SendRecv2D is disabled and client C-B responds with an SDP answer containing m-lines corresponding to Send2D and Recv3D:

m=video 12345 RTP/AVP 100
a=rtpmap:100 H264SbS3D/90000
a=fmtp:100 profile-level-id=42c01f; packetization-mode=1
a=sendonly
m=video 12345 RTP/AVP 106
a=rtpmap:106 H264/90000
a=fmtp:106 profile-level-id=42c01f; packetization-mode=1
a=recvonly
m=video 0 RTP/AVP 108

The matrix in the table below shows the negotiated media descriptions in the last SDP answer for all possible combinations of the capability sets above:

TABLE 1

Matrix of SDP negotiated media capabilities between all combinations of the capability groups in the example above, displayed as the last SDP answer. Client C-L2 is a client with the same media capabilities as client C-L; Client C-A2 is a client with the same media capabilities as client C-A; Client C-B2 is a client with the same media capabilities as client C-B; and Client C-C2 is a client with the same media capabilities as client C-C.

| Starting SDP negotiation | Sending last SDP answer | | | |
|---|---|---|---|---|
| | Client C-L2 | Client C-A2 | Client C-B2 | Client C-C2 |
| Client C-L | | | | |
| CapGroupSendRecv2D SendRecv2D | SendRecv2D | SendRecv2D | SendRecv2D | SendRecv2D |
| Client C-A | | | | |
| CapGroupSendRecv3D Send3D Recv3D Send2D, T = 1 Recv2D, T = 1 SendRecv2D, T = 2 | SendRecv2D | Send3D Recv3D | Send2D RecvsD | Send3D Recv2D |
| Client C-B | | | | |
| CapGroupSenct2DRecv3D Send2D Recv3D SendRecv2D, T = 1 | SendRecv2D | Send3D Recv2D | SendRecv2D | Send3D Recv2D |
| Client C-C | | | | |
| CapGroupSend3DRecv2D Send3D Recv2D SendRecv2D, T = 1 | SendRecv2D | Send2D Recv3D | Send2D Recv3D | SendRecv2D |

The other legacy 2D case:
CapGroupSend2DRecv2D:
Send2D
Recv2D
would yield in Send2D and Recv2D when negotiating SDP capabilities with client C-A and slightly extended versions of client C-B and client C-C.

If the intent is to send more than one stream in each direction the 3D signalling mechanism can be used as above. For instance, if the intent is to send two media streams in both directions, the above capability sets could be extended as disclosed below, with the modifications that the payload type could be different for each media description in an SDP message and that the second stream should use a different port from the first one:
CapGroup2StreamsSendRecv2D (legacy case):
SendRecv2D
SendRecv2D
CapGroup2StreamsSendRecv3D:
Send3D
Recv3D
Send3D
Recv3D
Send2D, T=2
Recv2D, T=2
Send2D, T=3
Recv2D, T=3
SendRecv2D, T=4
SendRecv2D, T=4
CapGroup2StreamsSend2DRecv3D:
Send2D
Recv3D
Send2D
Recv3D
SendRecv2D, T=2
SendRecv2D, T=2
CapGroup2StreamsSend3DRecv2D:
Send3D
Recv2D
Send3D
Recv2D
SendRecv2D, T=2
SendRecv2D, T=2

Here the created m-lines for the intended media streams are interleaved. For the second intended stream the number of discarded m-lines of the first stream is also considered.

A second overall embodiment is based on using another type of counter to keep track on which m-lines to discard.

According to the second overall embodiment different means for keeping track of which m-lines that should be disabled are applied. For instance, it could be possible to determine what m-lines to keep by performing a reverse threshold comparison (in relation to the threshold comparison disclosed in the first overall embodiment). For example, the predetermined threshold value T (in the second overall embodiment denoted T2) may according to the second overall embodiment take the initial value O.

Moreover, it could be possible to perform the steps of generating the SDP answer different than in the first overall embodiment, resulting in that, for instance, the following capability group settings could be applied for CapGroupSendRecv3D:

CapGroupSendRecv3D:
Send3D,
Recv3D,
Send2D, T2=1
Recv2D, T2=1
SendRecv2D, T2=1 where T2 would be a threshold value. If T2 is equal or higher than the number of previously enabled m-lines in the received SDP offer matching the current capability in terms of media type and direction, the current m-line in the incoming SDP offer should be disabled.

Although not explicitly mentioned, it is to be understood by a person skilled in the art that other variants of keeping track of which multiple m-lines should be disabled could also be applied.

A third overall embodiment is based on signalling the predetermined threshold parameter in metadata or in an SDP attribute.

According to the third overall embodiment the predetermined threshold parameter for the client capability set is signaled in the SDP messages, such as in the first SDP message, see above. Possible ways of signalling the predetermined threshold parameter could be in metadata or as a new attribute. This could be performed if two clients have not in advance decided on the threshold values for the capabilities in the capability groups available in the negotiation procedure.

A 3D video compatible client receiving the SDP offer and which does not have any prior knowledge of the possible capability groups of the offering client (e.g., how many media streams the offering client intend to set up) but understands the signaled 3D encoding name, would then be able to understand the intent of the offering client.

An example of an SDP offering produced from the CapGroupSend3DRecv2D with an attribute line with the threshold T is as follows:

m=video 12345 RTP/AVP 102
a=rtpmap:102 H264SbS3D/90000
a=fmtp:102 profile-level-id=42c01f; packetization-mode=1
a=sendonly
m=video 12345 RTP/AVP 104
a=rtpmap:104 H264/90000
a=fmtp:104 profile-level-id=42c01f; packetization-mode=1
a=recvonly
m=video 12345 RTP/AVP 108
a=rtpmap:108 H264/90000
a=fmtp:108 profile-level-id=42c01f; packetization-mode=1
a=threshold 1
a=sendrecv The answering client receiving the above SDP signalling and understanding the H264SbS3D encoding name, but not familiar with the disable m-line threshold settings in the capability set, would understand that only one media stream is to be set up in each direction.

A fourth overall embodiment is based on stream ID in order to determine what media stream a media description belongs to.

According to the fourth overall embodiment an intended media stream ID S is derived from the transport port of the m-line and is used for each media description in the capability set to indicate which intended media stream each media description belongs to. The answering client would then know the expected number of media streams and which media stream each media description belongs to. The stream ID S could also be signaled via SDP in metadata or as an attribute for each media description, e.g., similarly as outlined in the third overall embodiment above for the predetermined threshold parameter.

A fifth overall embodiment is based on using SDP attributes to signal the 3D video format.

According to the fifth overall embodiment, instead of using the encoding name for signalling the 3D video format for a given m-line, e.g. H264SbS3D, an attribute is used using the "a=3dFormat" attribute. Still, the disable m-line mechanism is applied to be able to signal asymmetric 2D video and/or 3D video configurations.

A sixth overall embodiment is based on enabling asymmetric signalling of 2D video codecs and/or other codec capabilities, and other attributes.

According to the sixth overall embodiment the disable m-line mechanism is used to enable asymmetrical signalling of 2D vide codec capabilities and/or other codec capabilities, such as audio codec capabilities, with the possibility to fall back to the sendrecv capability.

For instance, if the intent is to send H261 compliant media streams but to receive H264 or H261 compliant media streams with the possibility to fall back to sendrecv H261, the media descriptions of the SDP offer could be formulated as follows:

m=video 12345 RTP/AVP 102
a=rtpmap:102 H261/90000
a=sendonly
m=video 12345 RTP/AVP 104 105
a=rtpmap:104 H264/90000
a=fmtp:104 profile-level-id=42c01f; packetization-mode=1
a=rtpmap:105 H261/90000
a=recvonly
m=video 12345 RTP/AVP 108
a=rtpmap:108 H261/90000
a=threshold 1
a=sendrecv When negotiating media capabilities with a client with the same capabilities, an SDP media transmission session with sendonly H261 and recvonly H261 would be set up since H264 will not be a matching codec (after reversing the direction of the received offered SDP) and since the last m-line will be disabled due to the threshold.

A legacy answering client with only the following media description in the capability set:

m=video 12345 RTP/AVP 102
a=rtpmap:102 H261/90000
a=sendonly
m=video 12345 RTP/AVP 104
a=rtpmap:104 H261/90000
a=recvonly as well as a legacy answering client with the following media description in the capability set m=video 12345 RTP/AVP 108
a=rtpmap:108 H261/90000
a=sendrecv would also be able to send and receive H261 video (the attributes sendonly H261 and recvonly H261 compared to the attribute sendrecv H261) with the answering client understanding the keep m-line criteria mechanism.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for signalling asymmetric media capabilities using session description protocol (SDP) signalling, the method being performed by a first electronic device and comprising:
    acquiring media capabilities for at least one of sending media streams and receiving media streams by the first electronic device;
    generating an SDP offer comprising media descriptions for at least one media stream based on the acquired media capabilities, wherein at least one media stream in the SDP offer is represented by at least two media descriptions, the at least two media descriptions representing asymmetric media capabilities in relation to each other;
    sending a first SDP message comprising the generated SDP offer to a second electronic device, the first SDP message including a predetermined threshold parameter, the predetermined threshold parameter indicating a maximum number of media descriptions to be enabled by the second electronic device;
    receiving a second SDP message comprising an SDP answer from the second electronic device, wherein in the SDP answer at least one media description in the SDP offer for at least one of the at least one media streams has been disabled, and the at least one media streams has been disabled based on a determination that a counted number of enabled media descriptions in the SDP offer exceeds the predetermined threshold parameter; and
    sending said at least one media stream to the second electronic device in a media description being in accordance with the SDP answer.

2. The method of claim 1, wherein the step of generating the SDP offer further comprises:
    associating each media description with a direction, wherein each direction is indicated by an SDP attribute, wherein the SDP attribute sendonly is used to indicate the direction send only, wherein the SDP attribute recvonly is used to indicate the direction receive only, and wherein the SDP attribute sendrecv is used to indicate both the directions send only and receive only.

3. The method of claim 1, wherein the step of generating the SDP offer further comprises:
    including the predetermined threshold parameter in the first SDP message as at least one of SDP metadata and an SDP media description attribute.

4. The method of claim 1, wherein the media streams are audio streams or video streams, wherein the video streams comprise at least one or more of 2D video streams and 3D video streams.

5. The method of claim 4, wherein a 3dFormat attribute is used to signal the 3D video format.

6. The method of claim 1, wherein the media description comprises a media encoding name field, and wherein a 3D video format is signaled in said media encoding name field.

7. The method of claim 5, wherein the 3D video format is one from a group of a frame-packed side-by-side format, a frame-packed top-bottom format, a full resolution per view format, a frame interleaving format, a row-interleaving format, a video plus depth format, a multiview video coding (MVC) format, a multiview video coding extension of high efficient video coding (MV-HEVC) format, and a 3D high efficient video coding (3D-HEVC) format.

8. The method of claim 1, wherein the SDP offer comprises at least two different media streams where at least one is being associated with at least two media descriptions, and wherein the SDP offer further comprises stream IDs to associate each one of the at least two different media streams with its at least two media descriptions.

9. A method for signalling asymmetric media capabilities using session description protocol (SDP) signalling, the method being performed by a second electronic device and comprising:
    receiving a first SDP message comprising an SDP offer from a first electronic device, wherein the SDP offer comprises media descriptions for at least one media stream, the media descriptions being based on media capabilities for at least one of sending media streams and receiving media streams by the first electronic device, wherein at least one media stream in the SDP offer is represented by at least two media descriptions, the at least two media descriptions representing asymmetric media capabilities in relation to each other, and wherein the first SDP message includes a predetermined threshold parameter, the predetermined threshold parameter indicating a maximum number of media descriptions to be enabled by the second electronic device;
    generating an SDP answer from the SDP offer by disabling at least one media description in the SDP offer for at least one of the at least one media streams, wherein the step of generating the SDP answer comprises:
        counting a number of enabled media descriptions in the SDP offer for each combination of media format and direction, said direction being one from send only, receive only, and both send and receive, and
        determining disablement of the at least one media description based on a determination that the counted number of enabled media descriptions exceeds the predetermined threshold parameter; and
    sending a second SDP message comprising the SDP answer with the determined disablement of the at least one media description to the first electronic device.

10. The method of claim 9, wherein each direction is indicated by an SDP attribute, wherein the SDP attribute sendonly is used to indicate the direction send only, wherein the SDP attribute recvonly is used to indicate the direction receive only, and wherein the SDP attribute sendrecv is used to indicate both the directions send only and receive only.

11. The method of claim 9, wherein the step of generating the SDP answer comprises:
    deriving stream IDs from a transport port of the at least two media descriptions in the SDP offer.

12. The method of claim 9, further comprising:
    receiving the predetermined threshold parameter in at least one of SDP metadata and an SDP media description attribute.

13. An electronic device for signalling asymmetric media capabilities using session description protocol (SDP) signalling, the electronic device comprising a processing unit, the processing unit being arranged to:

acquire media capabilities for at least one of sending media streams and receiving media streams by the electronic device;

generate an SDP offer comprising media descriptions for at least one media stream based on the acquired media capabilities, wherein at least one media stream in the SDP offer is represented by at least two media descriptions, the at least two media descriptions representing asymmetric media capabilities in relation to each other;

send a first SDP message comprising the generated SDP offer to a second electronic device, the first SDP message including a predetermined threshold parameter, the predetermined threshold parameter indicating a maximum number of media descriptions to be enabled by the second electronic device;

receive a second SDP message comprising an SDP answer from the second electronic device, wherein in the SDP answer at least one media description in the SDP offer for at least one of the at least one media streams has been disabled, and the at least one media streams has been disabled based on a determination that a counted number of enabled media descriptions in the SDP offer exceeds the predetermined threshold parameter; and sending said at least one media stream to the second electronic device in a media description being in accordance with the SDP answer.

14. A 3D video conference system comprising at least one electronic device of claim 13.

15. An electronic device for signalling asymmetric media capabilities using session description protocol (SDP) signalling, the electronic device comprising a processing unit, the processing unit being arranged to:

receive a first SDP message comprising an SDP offer from a first electronic device, wherein the SDP offer comprises media descriptions for at least one media stream, the media descriptions being based on media capabilities for at least one of sending media streams and receiving media streams by the first electronic device, wherein at least one media stream in the SDP offer is represented by at least two media descriptions, the at least two media descriptions representing asymmetric media capabilities in relation to each other, and wherein the first SDP message includes a predetermined threshold parameter, the predetermined threshold parameter indicating a maximum number of media descriptions to be enabled by the second electronic device;

generate an SDP answer from the SDP offer by disabling at least one media description in the SDP offer for at least one of the at least one media streams, wherein the step of generating the SDP answer comprises:

counting a number of enabled media descriptions in the SDP offer for each combination of media format and direction, said direction being one from send only, receive only, and both send and receive, and determining disablement of the at least one media description based on a determination that the counted number of enabled media descriptions exceeds the predetermined threshold parameter; and send a second SDP message comprising the SDP answer with the determined disablement of the at least one media description to the first electronic device.

* * * * *